Figure 1:
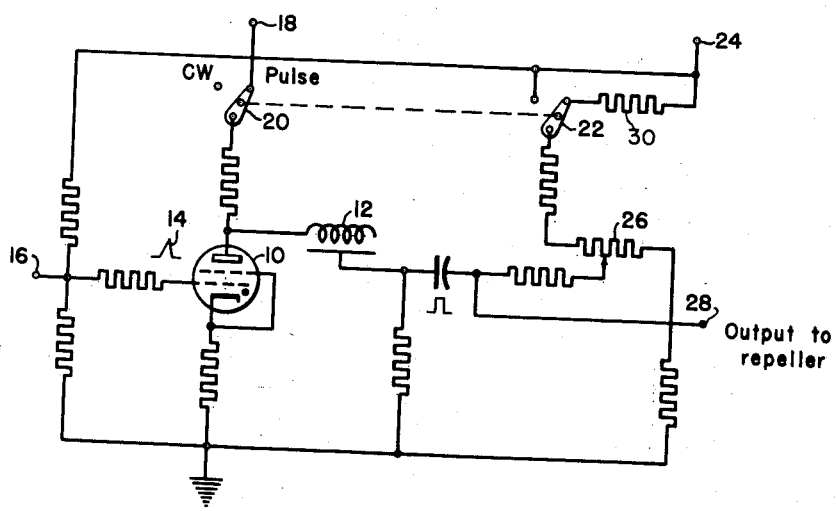

Aug. 4, 1953  J. W. TAYLOR, JR., ET AL  2,648,005
KLYSTRON OSCILLATOR
Filed Sept. 4, 1948

WITNESSES:
Robert C. Baird
New. C. Groves

INVENTORS
John W. Taylor, Jr. &
William S. Parnell.
BY
F. E. Crowder
ATTORNEY

Patented Aug. 4, 1953

2,648,005

UNITED STATES PATENT OFFICE 2,648,005

KLYSTRON OSCILLATOR

John W. Taylor, Jr., Baltimore, and William S. Parnell, Arbutus, Md., assignors to Westinghouse Electric Corporation, East Pittsburgh, Pa., a corporation of Pennsylvania Application September 4, 1948, Serial No. 47,794

9 Claims. (Cl. 250—36)

This invention relates to oscillators of signal generators for use at very high radio frequencies, and particularly to such a device which utilizes a tuned-cavity power tube adapted to operate either in a continuous-wave (C. W.) condition in which the high frequency output is continuous for substantial periods, or alternatively in a pulsed condition in which the high frequency energy is emitted in brief spurts or pulses separated by relatively long periods of quiescence.

It is a principal object of the invention to provide a signal generator of this type which utilizes a tuned-cavity oscillator of the reflex type, commonly referred to as a reflex klystron, and in which optimum output is obtained from the oscillator when operating in either C. W. or pulsed condition. As is well known to those skilled in this art, the power output of a reflex klystron oscillator whose resonant frequency is adjusted to a given value is dependent upon the voltage applied to the repeller electrode, there being an optimum value of repeller voltage for each frequency of operation. Any deviation of the repeller voltage from this optimum value produces a shift in the output frequency, together with a reduction in the power output at the new frequency, and too great a change in repeller voltage will cause oscillations to cease entirely. This last characteristic has been made use of in pulsing the output of klystron oscillators, the static negative repeller voltage being maintained at a value too low, for a given cavity frequency adjustment, to permit oscillation; thus, by raising the repeller voltage by periodic pulse voltages obtained in any desired way, and of sufficient negative magnitude to raise the negative repeller to the required level, the klystron will be caused to oscillate for a brief period corresponding to the effective length of the input pulses. However, unless the sum of the static repeller voltage and the applied input pulse voltage is equal to the optimum repeller voltage corresponding to a given adjustment of the tuned cavity of the klystron, the power output during pulsing will be less than the optimum value obtainable, and the output frequency will deviate from that to which the cavity was tuned.

It is clear from the above discussion that, if optimum output of the klystron is to be obtained under both C. W. and pulse conditions, the voltage applied to the repeller during C. W. operation must be reduced, for pulse operation, by an amount sufficient to cut off oscillation of the klystron, and the magnitude of this reduction must correspond with the pulse voltage to be applied, in order for the klystron to operate during pulses at the same optimum output and frequency for which it was adjusted in respect of C. W. operation.

Another object of the invention, therefore, is to provide a control circuit in which the switching of the klystron of the signal generator or oscillator from C. W. to pulse operation is achieved without interfering with the production of optimum output, either in terms of frequency or instantaneous power. Still another object is to provide such a control in which the equality of outputs is obtained at any frequency at which it is desired to operate, without necessitating any change in the pulse amplitude; that is, one in which the operations of returning the resonant cavity and readjusting the repeller voltage do not involve a concomitant adjustment of the pulse voltage amplitude.

A further object is to provide such a signal generator in which the repeller voltage will be maintained at its proper value substantially regardless of the amplitude of the control pulse, and of the flatness of the top of the pulse. The achievement of this object greatly simplifies the operation of the generator, and renders it more reliable in use.

Figure 2:
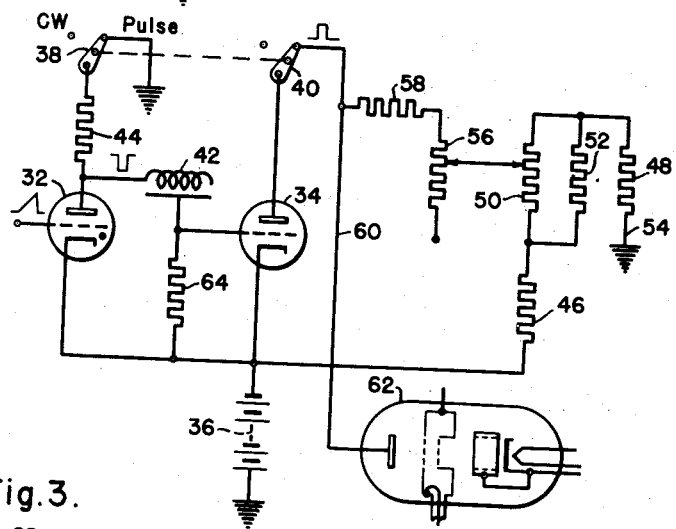
Figure 3:
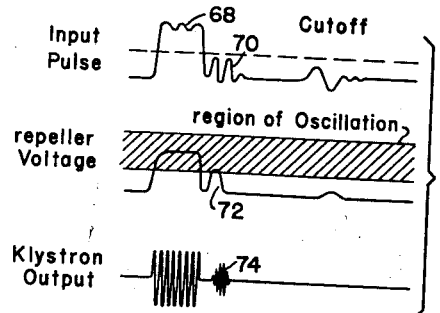
Figure 4:
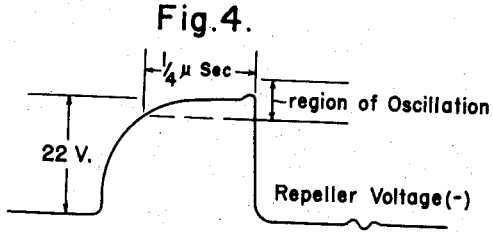

The above and other objects and advantages of the invention will best be understood from the following detailed specification of a preferred embodiment and mode of operation of the improved signal generator, taken in connection with the accompanying drawing, in which Fig. 1 is a schematic diagram of one form of control circuit which has been proposed to provide for alternative C. W. or pulse operation of a klystron tube, Fig. 2 is a similar schematic diagram of a circuit in accordance with our invention which overcomes certain disadvantages of the arrangement of Fig. 1, Fig. 3 is graphical representation of the pulse, repeller voltage and output voltage of the arrangement of Fig. 2, and Fig. 4 is a graphical representation, to a larger scale, of the shape of the control pulse.

It has been proposed to provide a signal generator which can be shifted from C. W. to pulse operation by providing a potentiometer for the adjustment of the repeller voltage during C. W. operation, and a switching system ganged to insert a fixed resistor in series with this potentiometer for reducing the repeller voltage by an amount equal to the voltage of the pulse generator, and simultaneously to switch the input from the C. W. source to the pulse source. Such an arrangement is illustrated schematically in Fig. 1 of the drawing, the pulse generator comprising a gas filled tube 10 and a pulse forming line 12 which are triggered by an input pulse 14 applied to point 16. Anode supply for tube 10 is furnished from a connection 18 as indicated, whenever switch 20 is in the "pulse" position. A second two-position switch 22 controls the application of a suitable negative potential from connection 24 to the klystron repeller electrode, through the potentiometer 26 and output connection 28. Switches 20 and 22 are ganged for conjoint operation, and it will be observed that when these switches are in the "pulse" position, the repeller voltage supplied to potentiometer 26 passes through a series resistor 30. As indicated above, if the drop in repeller voltage introduced by resistor 30 is precisely equal to the magnitude of the pulses produced by the trigger tube 10 and pulse forming line 12, then the repeller voltage applied during pulses will equal that for which the klystron was adjusted during C. W. operation, and the instantaneous power and the frequency of the klystron output will not vary as switches 20 and 22 are shifted from one condition to the other.

A great disadvantage of the above proposal is that the use of fixed resistor 30 in series with the potentiometer produces a fixed percentage of change in the repeller voltage, rather than an absolute change, with the result that equality of repeller voltage is obtained for only one setting of the potentiometer. For example, if the pulse amplitude is 20 volts, and a negative repeller voltage of 100 volts is required for optimum operation at the desired frequency, the series resistor 30 must drop the voltage of the repeller by 20%. However, if the klystron is adjusted to operate at some other frequency requiring, say, 80 volts, the same series resistor would drop the repeller 20% of 80 or 16 volts; superimposing the pulse voltage of 20 volts would then give 84 volts on the repeller during pulses, and reduced output at a different frequency would result.

Another disadvantage of the system above described is that the wave shape of the pulse applied is required to have a constant amplitude and a very flat top, since a small change in repeller voltage will alter the output of the klystron considerably.

In accordance with our invention, the above disadvantages are overcome by inserting a triode or other vacuum tube in parallel with the potentiometer used to adjust the repeller voltage for C. W. operation, instead of a fixed resistor in series therewith. The pulse from the pulse forming line is used to drive this tube beyond cut-off, rendering it ineffective to shunt any part of the current flow in the potentiometer, and thus restoring the oscillating condition present before the tube was switched into the circuit. By this means we overcome all of the objections to the prior proposals, in that the voltage applied to the repeller during the period of the pulse is automatically given the correct value—that is, the same voltage which existed during C. W. operation, regardless of the setting of the potentiometer, the amplitude of the pulse (so long as it is sufficient to bias the tube to cut-off), and the flatness of the pulse top. The shape of the top of the pulse has no effect since the tube will be cut off as long as the pulse voltage does not fluctuate more than a reasonable amount; moreover, while the bottom of the pulse wave must be reasonably flat to prevent cut-off when not desired, this condition is readily met since the repeller voltage must increase considerably before oscillations result.

Referring now to the schematic diagram of Fig. 2, numeral 32 designates a grid-controlled gas filled tube of the thyratron type, such as that commercially known as a type 2D21, while numeral 34 designates a vacuum tube which we have found is preferably a triode such as the 6J6. The cathodes of both these tubes are furnished with a negative potential which may be of the order of —200 volts with respect to ground, herein schematically indicated by a battery 36, though any equivalent D. C. source could be utilized. When the ganged switches 38 and 40 are in the "pulse" position as indicated in Fig. 2, the pulse-forming line 42 is allowed to charge up through a resistor 44. The negative line from battery 36 passes through a network comprising a pair of fixed resistors 46 and 48 and a potentiometer 50, the latter being shunted by a third fixed resistor 52, and thence to ground as indicated at 54. A second potentiometer 56 is connected "back to back" with potentiometer 50, for a purpose to be described, and the negative voltage for the repeller of the klystron is taken from one end of potentiometer 56 through a fixed resistor 58.

Switch 40, when in the "pulse" position, connects resistor 58 also to the plate of the triode 34, which puts the plate at a potential which is positive with reference to its cathode by an amount equal to the difference between 200 volts and the drop through the voltage control network, which is of the order of 80 to 100 volts, so that triode 34 conducts and acts as a partial shunt across the voltage tapped off by the voltage control network, maintaining the negative potential of the line 60 leading to the repeller of the klystron 62 at a value below that required for oscillation. This is accomplished by proper adjustment of the resistance values of the circuit. It is clear that if the tube 34 is rendered inoperative to shunt the voltage control network, either by switching it out or by biasing its grid to a value at which it is rendered non-conductive, then the negative potential of line 60 will rise to a value to place the klystron 62 in oscillating condition, provided the network has been adjusted for oscillation in C. W. position.

The grid of tube 34 is therefore connected to the output end of the pulse forming line 42, so that a positive pulse such as indicated at 64 and of sufficient magnitude to fire the thyratron 32 will discharge the pulse forming line and apply the resulting negative pulse to the grid of the vacuum tube 34. This negative pulse cuts off tube 34, which allows the voltage on the repeller of the klystron to rise to the value determined solely by the voltage control network, and the klystron 62 operates during the time of application of this pulse to the grid of tube 34. In order to make the initial adjustment to the desired frequency, the ganged switches 38 and 40 are set to the C. W. position, and the repeller voltage is adjusted by means of the ganged potentiometers 50 and 56 to the value which produces optimum output at the desired frequency; this adjustment is not changed after it has once been set for best C. W. operation at the intended frequency. When the switches are changed to the "pulse" position, the repeller voltage will be dropped sufficiently to cut off oscillation of the klystron until such time as a positive trigger on thyratron 32 restores the repeller voltage to the identical value it had during the C. W. operation.

The reason for the use of ganged potentiometers 50 and 56 will now be explained. In the ordinary case, it is necessary to have the drop in repeller voltage introduced by the tube 34 of the order of 20 volts, and to accomplish this by a simple plate resistor for tube 34 would have required a large value of this resistance, which in conjunction with the capacitance of tube 34 and other stray capacitance would have introduced a rather high time constant, whose effect would be to impose a considerable slant on the leading edge of the pulse superimposed upon the static repeller voltage. To compromise between the necessity for the stated voltage drop and the desirability of a low time constant, potentiometers 50 and 56 were so arranged that when they are near the upper limits of their positions as in Fig. 2, the resistance of the plate circuit of tube 34 can be made low, while when they are near their lower positions, a high plate resistance is needed in order to get the desired drop at the repeller. The rise time is particularly important, the time constant is reduced by reducing the plate resistance by cutting out more of plate resistor 56, the desired voltage drop being provided by the corresponding increase in resistance drop across potentiometer 50 and resistance 46. For conditions requiring a larger drop and hence a higher plate load resistance for tube 34, the potentiometers are moved toward their lower positions, and some compromise with minimum rise time of the repeller pulse is required. Over the required range, both conditions are satisfied in an acceptable manner by a voltage control network whose components have the following values, which are to be understood as indicative only, since they may be widely varied to suit particular requirements:

| | Ohms |
|---|---|
| Resistor 46 | 1,000 |
| Resistor 48 | 1,000 |
| Potentiometer 50 | 2,500 |
| Resistor 52 | 2,000 |
| Potentiometer 56 | 1,000 |
| Resistor 58 | 560 |

Resistor 44, through which is charged the pulse forming line, may have a value of the order of 560,000 ohms in the prefered embodiment, and resistor 64 connecting the other end of this line to the negative voltage source may be of the order of 120 ohms, its value being chosen to provide such an initial bias for tube 34 as to ensure cut-off when the pulse from line 42 is superimposed thereon.

We have indicated above that a triode, such as the commercial 6J6, is preferred for the tube 34, since we have found that its lower output capacitance provides a desirably short rise time for the additive pulse on the repeller electrode; however, we do not wish to limit our invention to the use of this particular tube, as others may be found better for particular conditions or applications, or may be adapted for less critical requirements as to rise time of the pulse.

Fig. 3 of the drawing represents graphically the voltages appearing in indicated portions of our improved circuit. Numeral 68 designates an input pulse from the pulse forming line to the tube 34, sufficient to raise its negative value above the cut-off voltage, and it is clear from this figure that the flatness of the top of this pulse is of no importance, so long as it contains no dips sufficient to allow the grid to drop below cut-off. The requirement for a reasonably clean bottom of the pulse is indicated at 70, which designates a departure sufficient to raise the repeller voltage into the region of oscillation, as shown at 72 and 74 on the corresponding graphs of repeller voltage and klystron output.

Fig. 4 of the drawing illustrates graphically a desirable shape of additive pulse applied to the repeller, the flatness of that portion thereof lying within the region of oscillation corresponding to a high degree of precision in output frequency, and which is obtained at the optimum output conditions for that frequency.

It will be seen from the above that not only does the herein disclosed arrangement satisfy all of the objects of our invention, but that the arrangement of the control tubes with their cathodes at the same negative potential as the repeller voltage supply makes it unnecessary to provide a separate positive anode supply for these tubes.

We have disclosed our invention, as contemplated by the patent laws, in connection with a preferred embodiment thereof and the best mode of which we are aware for practicing the same, but it is to be understood that many changes and modifications thereof can be made by those skilled in the art without departing from the spirit of our invention as defined in the appended claims.

We claim as our invention:

1. In combination, an oscillator of the type whose frequency is a function of the voltage applied to one of its electrodes, a control circuit provided with switching means for supplying to said electrode a voltage derived from a selected one of a plurality of input circuits, a voltage control network in said control circuit for adjusting the magnitude of voltage applied to said electrode when said switching means is in one position of operation, a space discharge element connected in shunt relation to at least a portion of said network when said switching means is in another position of operation to reduce the voltage on said electrode below the minimum required for operation, and means for rendering said space discharge element non-conductive to restore the voltage on said electrode to the value determined by said network in the first position of said switching means.

2. The invention in accordance with claim 1, in which the means for rendering said space discharge element non-conductive comprises a pulse forming line connected to an electrode thereof.

3. The invention in accordance with claim 1, in which said means for rendering the space discharge element non-conductive comprises a pulse forming line, means for charging said line, and thermionic means for discharging said line to an electrode of said element.

4. The invention in accordance with claim 1, in which the means for rendering the space discharge element non-conductive comprises a pulse forming line, means for charging said line, and a thyratron tube for discharging said line to apply a control pulse to said element.

5. The invention in accordance with claim 1, in which said space discharge element comprises a vacuum tube having at least one control grid and characterized by relatively low output capacitance.

6. The invention in accordance with claim 5, and in which said means for rendering the space discharge element non-conductive comprises a pulse forming line connected to said grid.

7. The invention in accordance with claim 6, and gaseous discharge means for discharging said pulse forming line.

8. In combination, an oscillator comprising a reflex klystron having a repeller electrode, switching means for supplying to said repeller voltages derived from a selected one of a plurality of input circuits, a voltage control and equalizing circuit for said reflex klystron, comprising a source of negative potential, a potentiometer for adjusting the portion of said potential applied to said klystron repeller, a space discharge device for shunting at least a portion of said potentiometer, and means for adjusting the plate resistance of said device concomitantly with the adjustment of said potentiometer, whereby the voltage on said repeller electrode is such as to give maximum oscillator output, regardless of the input circuit selected.

9. In combination, an oscillator comprising a reflex klystron having a repeller electrode, switching means for supplying to said repeller electrode voltages derived from a selected one of a plurality of input circuits, a voltage control and equalizing circuit for said reflex klystron, comprising a source of negative voltage, a potentiometer for adjusting the portion of said voltage applied to said klystron, a space discharge device for shunting at least a portion of said potentiometer, means for rendering said device ineffective as a shunt across said potentiometer in response to an input pulse, whereby the voltage on said repeller electrode is such as to give maximum oscillator output, regardless of the input circuit selected.

JOHN W. TAYLOR, Jr.
WILLIAM S. PARNELL.

References Cited in the file of this patent
UNITED STATES PATENTS

| Number | Name | Date |
| --- | --- | --- |
| 1,966,216 | Philpott | July 10, 1934 |
| 1,988,270 | Fischer et al. | Jan. 15, 1935 |
| 2,149,080 | Wolff | Feb. 28, 1939 |
| 2,250,511 | Varian | July 29, 1941 |
| 2,394,389 | Lord | Feb. 5, 1946 |
| 2,462,294 | Thompson | Feb. 22, 1949 |
| 2,475,074 | Bradley et al. | July 5, 1949 |
| 2,477,485 | Jacob | July 26, 1949 |
| 2,493,011 | Miller | Jan. 3, 1950 |
| 2,505,542 | Hahn | Apr. 25, 1950 |
| 2,516,201 | Goodwin | July 25, 1950 |